United States Patent
Biskeborn et al.

(10) Patent No.: US 7,551,393 B2
(45) Date of Patent: Jun. 23, 2009

(54) TAPE RECORDING HEAD WITH MULTIPLE PLANES OF TRANSDUCER ARRAYS

(75) Inventors: Robert Glenn Biskeborn, Hollister, CA (US); Leif Stefan Kirschenbaum, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 601 days.

(21) Appl. No.: 10/924,597

(22) Filed: Aug. 23, 2004

(65) Prior Publication Data

US 2006/0039082 A1    Feb. 23, 2006

(51) Int. Cl.
G11B 5/39 (2006.01)
G11B 5/265 (2006.01)

(52) U.S. Cl. ...................... 360/121; 360/316
(58) Field of Classification Search ................ 360/121, 360/316
See application file for complete search history.

(56) References Cited

U.S. PATENT DOCUMENTS

| | | | | |
|---|---|---|---|---|
| 4,001,841 A | * | 1/1977 | Berkowitz | 346/74.5 |
| 4,558,380 A | * | 12/1985 | Porter | 360/53 |
| 5,027,245 A | * | 6/1991 | Nagata et al. | 360/121 |
| 5,153,980 A | * | 10/1992 | Kira | 29/603.14 |
| 5,210,667 A | * | 5/1993 | Zammit | 360/316 |
| 5,289,328 A | * | 2/1994 | Saliba | 360/121 |
| 5,307,217 A | * | 4/1994 | Saliba | 360/76 |
| 5,541,793 A | * | 7/1996 | Schwarz | 360/121 |
| 5,771,142 A | * | 6/1998 | Maurice et al. | 360/121 |
| 5,982,591 A | * | 11/1999 | Folkerts et al. | 360/121 |
| 7,193,812 B2 | * | 3/2007 | Eaton | 360/121 |
| 7,265,940 B2 | * | 9/2007 | Nagai | 360/121 |
| 7,266,880 B2 | * | 9/2007 | Biskeborn et al. | 29/603.15 |
| 7,342,748 B2 | * | 3/2008 | Yip et al. | 360/241.1 |
| 7,450,340 B2 | * | 11/2008 | Lee et al. | 360/121 |
| 2003/0016474 A1 | * | 1/2003 | Biskeborn | 360/319 |
| 2004/0021982 A1 | * | 2/2004 | Ozue et al. | 360/121 |
| 2005/0047008 A1 | * | 3/2005 | Tateishi | 360/121 |
| 2005/0259353 A1 | * | 11/2005 | Magnusson | 360/121 |
| 2005/0259358 A1 | * | 11/2005 | Ozue | 360/129 |

* cited by examiner

*Primary Examiner*—Brian E Miller
(74) *Attorney, Agent, or Firm*—William D. Gill; Jeffrey P. Aiello (57) ABSTRACT

A tape recording head is provided comprising a multiple plane transducer row having a plurality of planes of transducer arrays fabricated on a substrate and which may be staggered or offset relative to one another in a direction perpendicular to the direction of linear motion of the recording tape over the recording head. The multiple plane recording head provides a significant advantage over a head having a single transducer plane by allowing simultaneous reading (or writing) of data tracks on a magnetic recording tape that are more closely spaced apart with respect to one another than the spacing of the read (or write) transducers in a single plane.

4 Claims, 9 Drawing Sheets

TAPE RECORDING HEAD WITH MULTIPLE PLANES OF TRANSDUCER ARRAYS

BACKGROUND OF THE INVENTION

1. Field of the Invention

This invention relates to magnetic tape recording heads, and more particularly to a tape recording head having a plurality of planes of transducer arrays to enable close or overlapping read and/or write transducers.

2. Description of the Related Art

In magnetic storage systems, data is read from and written onto magnetic recording media utilizing magnetic transducers commonly referred to as magnetic heads. Data is written on the magnetic recording media by moving a magnetic recording head to a position over the media where the data is to be stored. The magnetic recording head then generates a magnetic field, which encodes the data into the magnetic media. Data is read from the media by similarly positioning the magnetic read head and then sensing the magnetic field of the magnetic media. Read and write operations are independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape. Because of the ongoing desire to increase data storage density on tape media, it is desirable to reduce the track width and increase the number of tracks recorded across the tape. In one configuration of multitrack tape heads, commonly used in tape recording systems, a linear array of alternating read heads and write heads is formed on a substrate. As the track spacing is reduced, it becomes increasingly difficult to fabricate arrays of MR sensors closely spaced apart on the substrate. Similarly, it becomes difficult to fabricate arrays of write transducers. Fabrication of two or more read sensors extremely close together presents a number of problems with thin-film processing tolerances in addition to instability, noise and cross talk between two such elements. Similarly, fabrication of two or more write transducers extremely close together presents processing problems. Therefore, there is an ongoing need for a multitrack tape recording head that overcomes these limitations and provides an array of read or write transducers capable of reading and/or writing very closely spaced or abutting data tracks.

SUMMARY OF THE INVENTION

In accordance with the principles of the present invention, there is disclosed a tape recording head comprising a multiple plane transducer row having a plurality of planes of transducer arrays fabricated on a substrate which may be staggered or offset relative to one another in a direction perpendicular to the direction of linear motion of the recording tape over the recording head.

In one embodiment, the tape recording head comprises a multiple plane transducer row having an array of spaced apart alternating read and write transducers in a first plane and similar array of read and write transducers in at least a second plane formed over the first plane. The first and second planes of similar alternating read and write transducers are generally, but not necessarily, offset or staggered with respect to one another in a direction perpendicular to the direction of linear motion of the recording tape over the recording head.

In another embodiment, the tape recording head comprises a multiple plane transducer row having an array of spaced apart read transducers in a first plane and a similar array of spaced apart read transducers in at least a second plane formed over the first plane. The first and second planes of similar read transducers are generally, but not necessarily, offset or staggered with respect to one another in a direction perpendicular to the direction of linear motion of the recording tape over the recording head.

In another embodiment, the tape recording head comprises a multiple plane transducer row having an array of spaced apart write transducers in a first plane and a similar array of spaced apart write transducers in at least a second plane formed over the first plane. The first and second planes of similar write transducers are generally, but not necessarily, offset or staggered with respect to one another in a direction perpendicular to the direction of linear motion of the recording tape over the recording head.

In another embodiment, the tape recording head comprises a multiple plane transducer row having an array of spaced apart magnetic transducers in a first plane, an array of spaced apart magnetic transducers in a second plane formed over the first plane and an array of spaced apart magnetic transducers in at least a third plane formed over the second plane. The second and third planes of magnetic transducers are generally, but not necessarily, offset or staggered with respect to one another in a direction perpendicular to the direction of linear motion of the recording tape over the recording head.

In another embodiment, the tape recording head comprises a multiple plane transducer row having an array of spaced apart read transducers in a first plane, an array of spaced apart write transducers in a second plane formed over the first plane and an array of spaced apart read transducers in at least a third plane formed over the second plane. The second and third planes of similar write and read transducers, respectively, are preferably aligned with respect to the read transducers of the first plane in a direction perpendicular to the direction of linear motion of the recording tape over the recording head.

For a fuller understanding of the nature and advantages of the present invention, reference should be made to the following detailed description taken together with the accompanying drawings.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings:

FIG. 2b is an enlarged top plan view of the read write transducers of the Prior Art transducer row shown in FIG. 2a;

DETAILED DESCRIPTION OF THE PREFERRED EMBODIMENT

Figure 1:
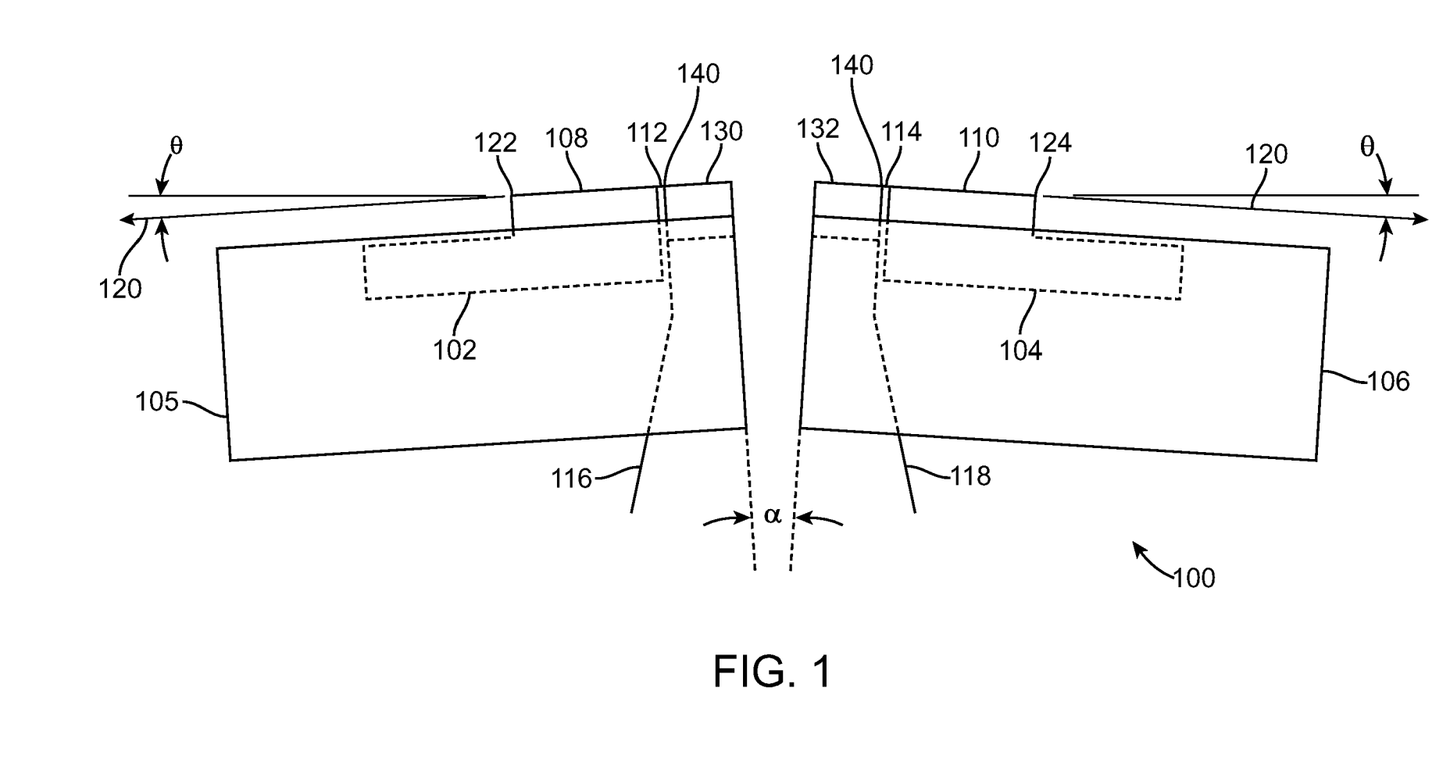
FIG. 1 is an end view illustration, not to scale, of flat contour linear tape recording head.

FIG. 1 illustrates a bi-directional read-while-write flat contour head 100 using the multiple plane transducer array of the present invention. Rowbar substrates 102 and 104 of a wear resistant material, such as the substrate ceramic typically used in magnetic disk drive heads, are mounted in carriers 105 and 106 fixed at a small angle α with respect to each other. The ceramic rowbar substrates 102 and 104 are provided with flat transducing surfaces 108 and 110 and a row of transducers 140 at the surfaces of gaps 112 and 114. Electrical connection cables 116 and 118 connect the transducers to the read/write channel of the associated tape drive.(shown generally in FIG. 6). Rollers (not shown) are used to control the overwrap angle θ of the tape 120 at edges 122 and 124. The wrap angle going onto the flat transducing surface is usually between ⅛ degree and 4.5 degrees. The rows of transducers are protected by closures 130 and 132 made of the same or similar ceramic as the rowbar substrates 102 and 104.

Figure 2A:
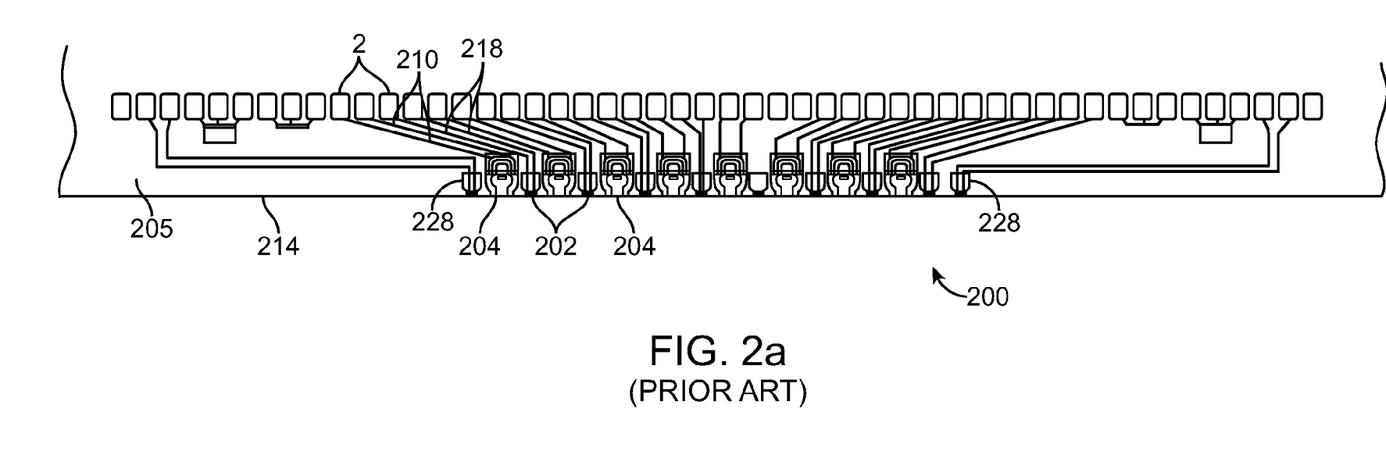
FIG. 2a is a top plan view, not to scale, of a Prior Art tape recording head transducer row having an array of alternating side-by-side and writ tansducers.
Figure 2B:
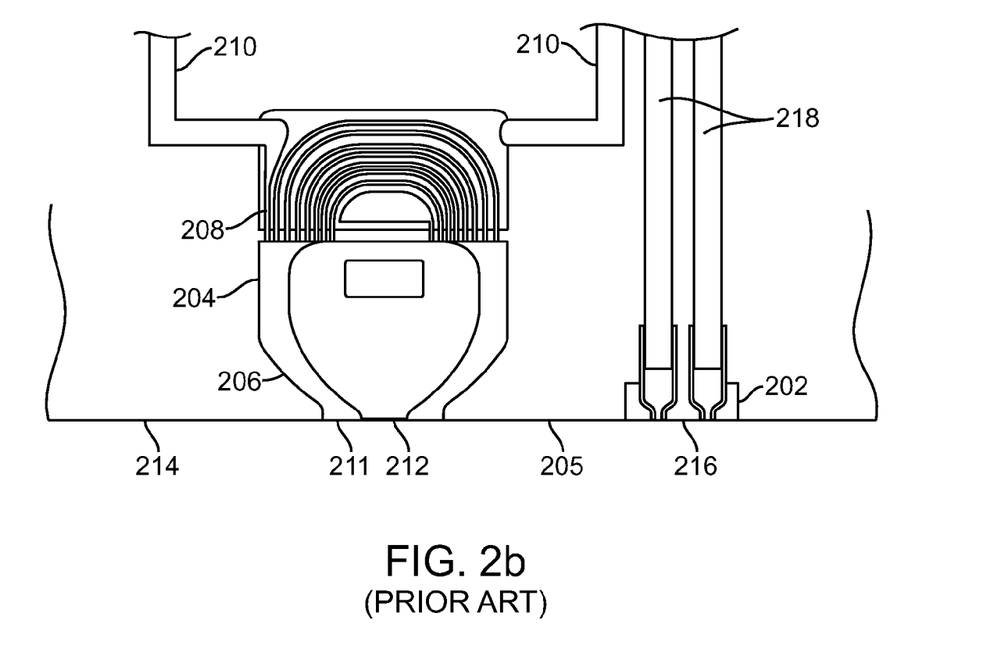
Figure 2C:
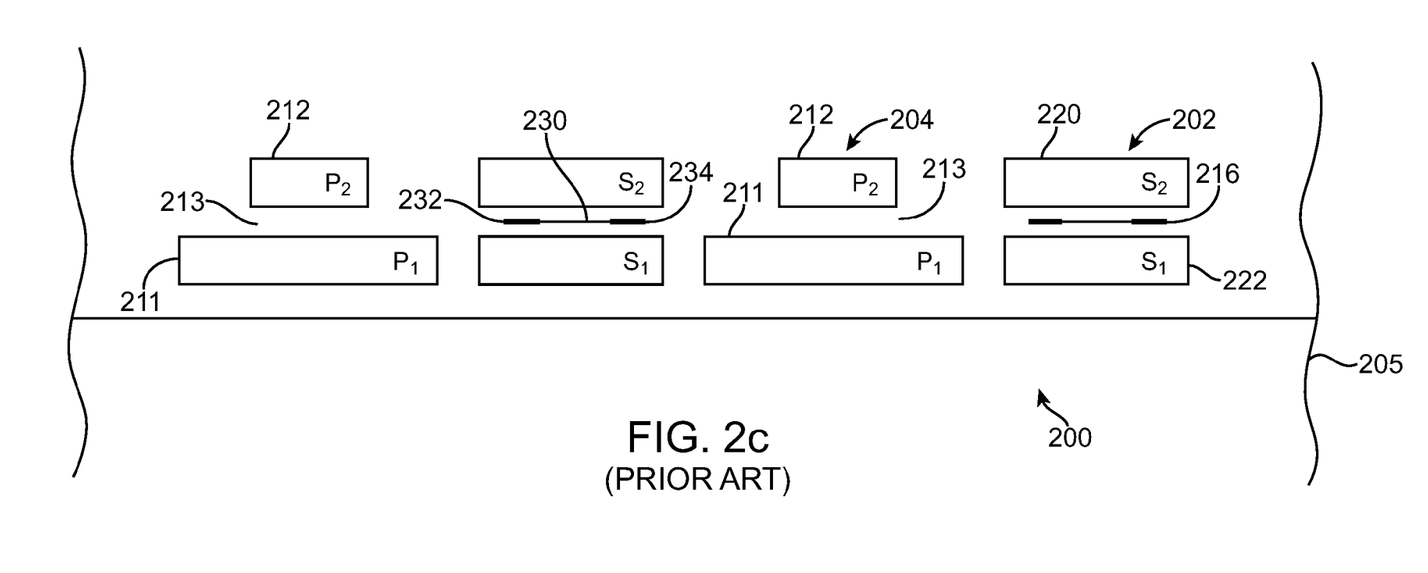
FIG. 2c is a transducing surface view, not to scale, of a segment of the Prior Art tape recording head transducer row of FIG. 2a having alternating side-by-side read and write transducers.

FIGS. 2a and 2b are plan views, not to scale, of a Prior Art tape recording head transducer row 200 having a linear array of alternating side-by-side read and write transducers 202 and 204, respectively, formed on a ceramic substrate 205 by thin film deposition methods well known to the art. FIG. 2c is a transducing surface view, not to scale, of a segment of the Prior Art tape recording head transducer row 200. The write transducer 204 comprises a magnetic yoke 206 threaded with a pancake coil structure 208 connected to leads 210 supplying a write current to the coil. The write current induces a magnetic flux in the yoke 206 which results in a magnetic write field across first and second write poles (P1 and P2) 211 and 212, respectively, at a write gap 213 at the transducing surface 214 in close proximity to a magnetic recording tape (not shown). The read transducer 202 comprises a magnetoresistive (MR) sensor 216 connected to leads 218 for detecting magnetic signals recorded on data tracks on the magnetic recording tape. The MR sensor 216 has a central region 230 and edge regions 232 and 234. Central region 230 is the sensing region of the sensor and edge regions 232 and 234 are inactive regions providing biasing and lead connections for the sensor. Contact pads 229 connected to leads 210 and 218 are connected to electrical connector cables (shown in FIG.1) to connect the read and write transducers to the read/write channel of the associated tape drive. Upper and lower shields (S2 and S1) 220 and 222, respectively, provide magnetic shielding of the MR sensor 216 from stray magnetic signals. The read transducers 202 described with reference to FIGS. 2a, 2b and 2c, may comprise anisotropic magnetoresistive (AMR), giant magnetoresistive (GMR), magnetic tunnel junction (MTJ) sensors or other sensors well known to the art. Servo read heads 228 formed at the ends of the array for reading servo tracks written on the magnetic tape provide timing and positional data as known to the art.

Figure 3:
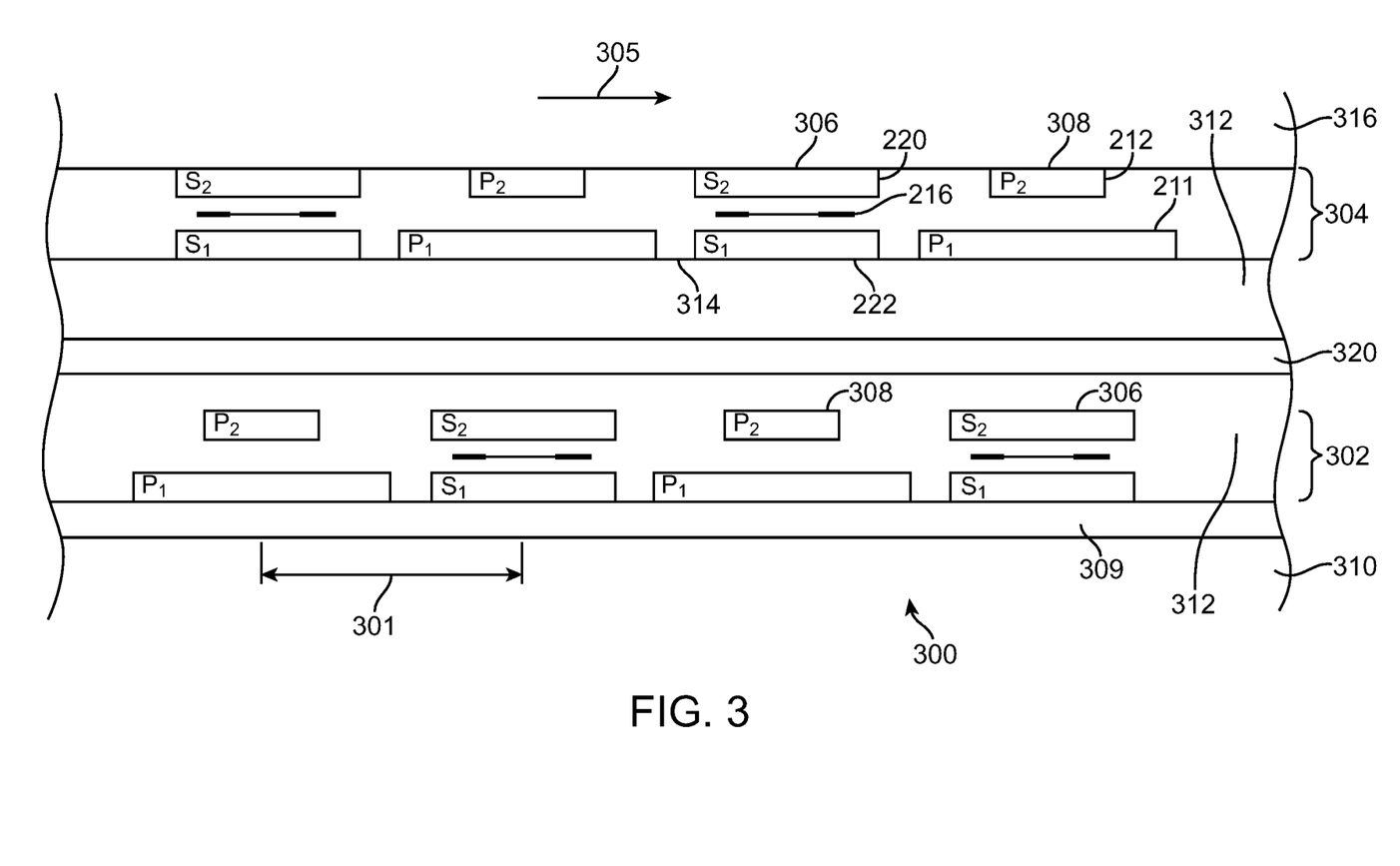
FIG. 3 is a transducing surface view, not to scale, of a multiple plane transducer row having an array of alternating read and write transducers in two planes.

Close spacing of the alternating read and write transducers 202 and 204 is constrained by the planar dimensions of the transducers and leads and by thin film processing and electrical interference considerations. To overcome these limitations, a first embodiment of a tape head of this invention comprising a multiple plane transducer row 300 is shown in FIG. 3. FIG. 3 is an transducing surface view, not to scale, of a tape recording head transducer row having a linear array of alternating read and write transducers 306 and 308, respectively, fabricated in a first plane 302 and a similar array of read and write transducers in at least a second plane 304 formed over the first plane. The first and second planes 302 and 304 of similar alternating read and write transducers are generally offset or staggered with respect to one another in a direction, indicated by arrow 305, perpendicular to the direction of linear motion of the recording tape over the recording head. Preferably, the first and second plane are offset so that a read transducer 306 in the second plane 304 is aligned with a write transducer 308 in the first plane 302 as shown in FIG. 3, however, the first and second planes may be offset with respect to one another by any desired amount. Each of the first and second planes 302 and 304 comprise arrays of alternating read and write transducers similar to those of the single plane of the head transducer row 200 of FIGS. 2a, 2b and 2c.

The multiple plane transducer row 300 provides a significant advantage over a single plane transducer row by allowing simultaneous reading (or writing) of adjacent data tracks on a magnetic recording tape that are more closely spaced apart than the spacing of the read (or write) transducers in a single plane with respect to one another. The ability to simultaneously read or write closely spaced tracks makes it possible to increase the track density on the magnetic recording tape while still maintaining high read and write data rates and rapid data accessibility. Another advantage of the transducer row 300 is that it can be used in conjunction with the optional electromagnetic interference (EMI) shield 320 to create a single module read-while-write head.

A further advantage of the multiple plane transducer row 300 of alternating of read and write transducers is that when the widths of the read and write transducers are different, the pitch 301 of the array is reduced to ½(reader width+writer width) from the width of the widest transducer for a configuration having a plane of read transducers and a plane of write transducers.

The multiple plane transducer row 300 may be fabricated by deposition of the first plane 302 on an undercoat layer 309 deposited on a substrate 310 using photolithographic and thin film deposition and plating processes known to the art followed by deposition of an insulator layer 312, preferably $Al_2O_3$, over the array of alternating read and write transducers of the first plane 302. A chemical mechanical etching process (CMP), or alternatively another planarization process, is then used to flatten the surface 314 of insulator layer 312. The second plane 304 is deposited with the desired offset relative to the first plane 302 on the planarized surface 314 of the insulator layer 312 by the same photolithographic and thin film deposition processes used in the deposition of the first plane 302. A protective insulator layer 316 is then deposited over the second plane. If desired, the EMI shield layer 320 of metal is deposited between the first plane 302 and the second plane 304 by interruption of the deposition of insulator layer 312 to allow insertion of the EMI shield layer.

Figure 4A:
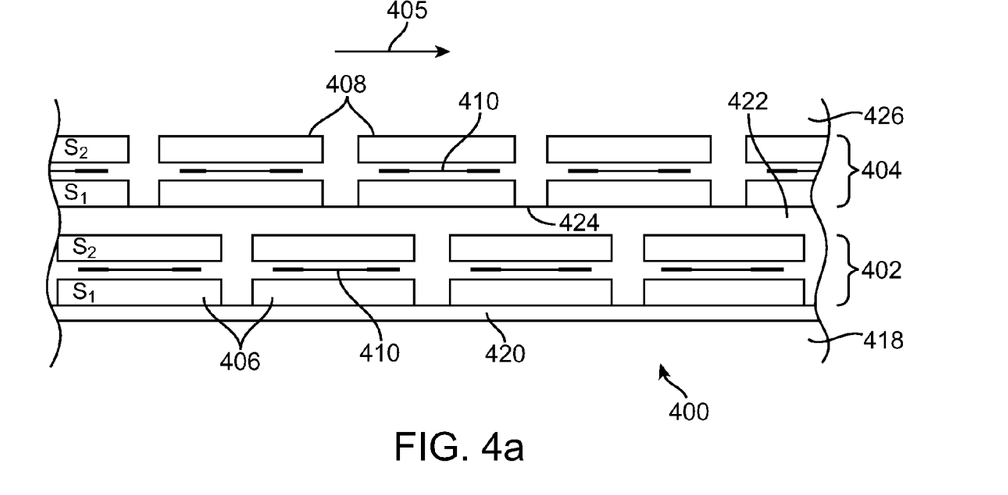
FIG. 4a is a transducing surface view, not to scale, of a multiple plane transducer row having an array of read transducers in two planes.

FIG. 4a is a transducing surface view, not to scale, of another embodiment of the invention wherein a multiple plane transducer row 400 comprises a first plane 402 of spaced apart read transducers 406 and at least a second plane 404 of spaced apart read transducers 408 formed over the first plane 402. The second plane 404 is generally offset or staggered with respect to the first plane 402 in a direction 405 perpendicular to the direction of linear motion of the recording tape over the recording head. Preferably, the first and second planes are offset so that a read transducer 408 in the second plane 404 is aligned midway between read transducers 406 in the first plane 402 as shown in FIG. 4a, however, the first and second layers may be offset with respect to one another by any desired amount. Read transducers 406, 408 are the same or similar to the read transducers 202 described with reference to FIGS. 2a, 2b and 2c.

The multiple plane read transducer row 400 of the present invention enables read sensors 410 to be spaced closer together in a direction perpendicular to the direction of linear motion of the recording tape over the recording head than is possible with the usual single plane transducer row. This feature allows writing and reading track 'bundles' which are groups of tracks simultaneously written adjacent to one another. The tracks may even be written contiguous to one another to maximize storage density on the recording tape while still allowing simultaneous reading of the tracks in a bundle to optimize data rate.

The multiple plane transducer row 400 may be fabricated by deposition of the first plane 402 on an undercoat layer 420 deposited on a substrate 418 using photolithographic and thin film deposition and plating processes known to the art followed by deposition of an insulator layer 422, preferably Al$_2$O$_3$, over the array of alternating read and write transducers of the first plane 402. A chemical mechanical etching process (CMP) or other planarization process is then used to flatten the surface 424 of the insulator layer 422. The second plane 404 is deposited with the desired offset relative to the first plane 402 on the planarized surface 424 of the insulator layer 422 by the same photolithographic and thin film deposition processes used in the deposition of the first plane 402. A protective insulator layer 426 is then deposited over the second plane 404. An additional plurality of planes may be formed over the second plane by repeating the above fabrication steps.

Figure 4B:
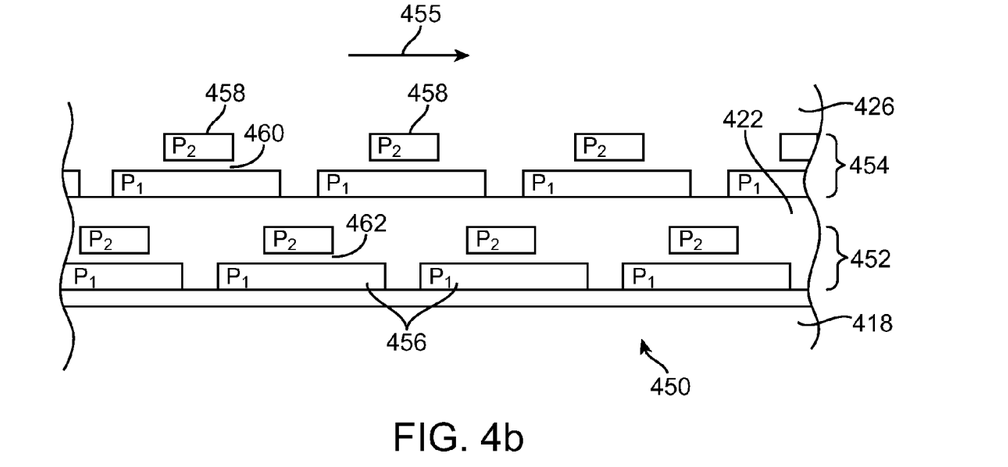
FIG. 4b is a transducing surface view, not to scale, of a multiple plane transducer row having an array of write transducers in two planes.

FIG. 4b is a transducing surface view, not to scale, of another embodiment of the invention wherein a multiple plane transducer row 450 comprises a first plane 452 of spaced apart write transducers 456 and at least a second plane 454 of spaced apart write transducers 458 formed over the first plane 452. The second plane 454 is generally offset or staggered with respect to the first plane 452 in a direction 455 perpendicular to the direction of linear motion of the recording tape over the recording head. Preferably, the first and second planes are offset so that the write gap 460 of a write transducer 458 in the second plane 454 is aligned midway between the write gaps 462 of write transducers 456 in the first plane 452 as shown in FIG. 4b, however, the first and second planes may be offset with respect to one another by any desired amount. Write transducers 456, 458 are the same or similar to the write transducers 202 described with reference to FIGS. 2a, 2b and 2c. Alternatively, at least one of the first and second planes includes one or more read transducers 470 which may be used as servo read heads as is known to the art.

Figure 5A:
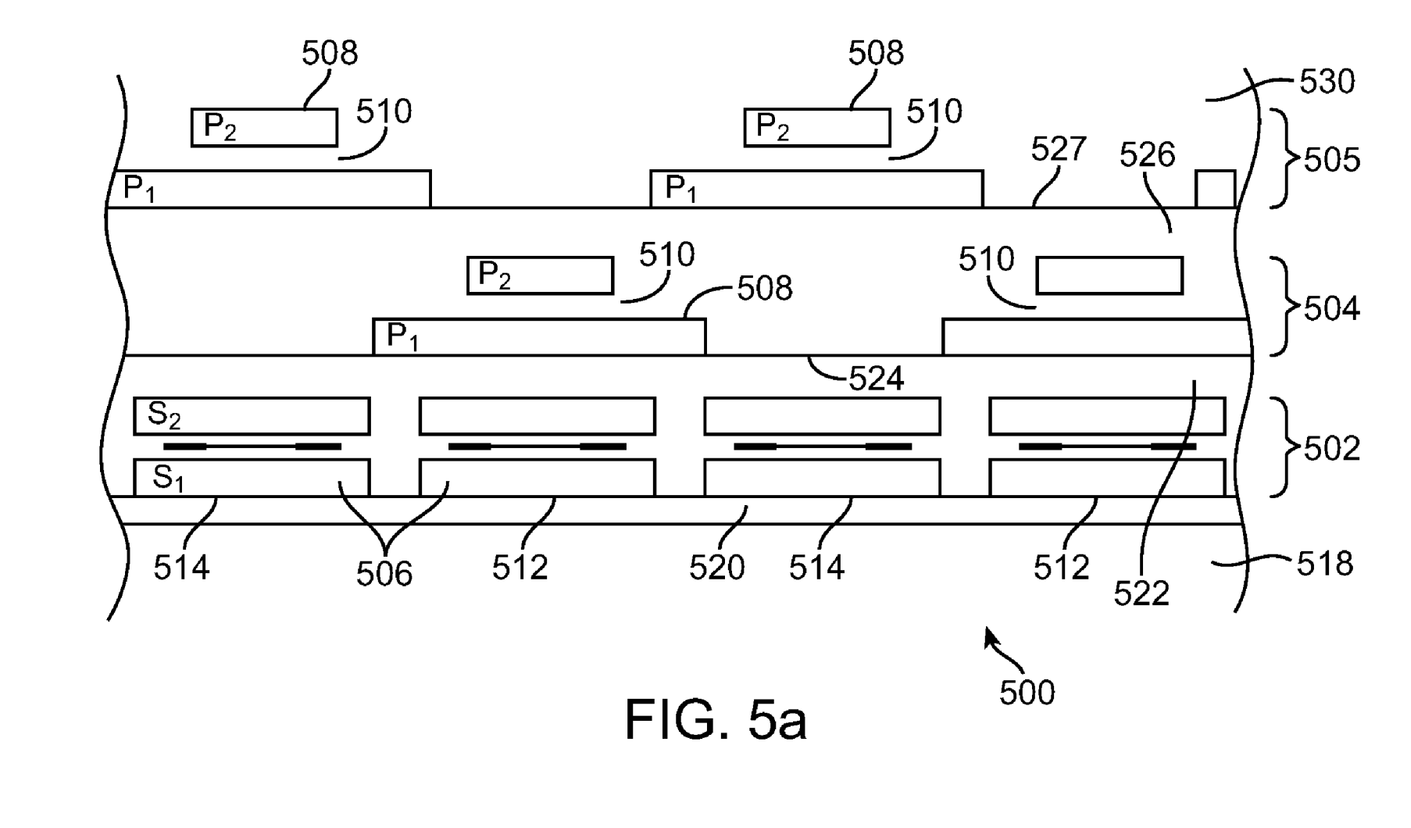
FIG. 5a is a transducing surface view, not to scale, of a multiple plane transducer row having an array of read transducers in a first plane and two planes of write transducer arrays in second and third planes.

FIG. 5a is an transducing surface view, not to scale, of another embodiment of the invention wherein a multiple plane transducer row 500 comprises a first plane 502 of spaced apart read transducers 506, a second plane 504 of spaced apart write transducers 508 formed over the first plane 502 and at least a third plane 505 of spaced apart write transducers 508 formed over the second plane 504. The second plane 504 is offset or staggered with respect to the first plane 502 in a direction perpendicular to the direction of linear motion of the recording tape over the recording head. Since write tranducers 508 are usually wider than read transducers 506, the write gaps 510 of the second plane 504 of write transducers are preferably aligned with every second read transducer 512 of the first plane and the write gaps 510 of the third plane 505 of write transducers are preferably aligned with the remaining read transducers 514 of the first plane. Write transducers 508 are the same or similar to the write transducers 204 described with reference to FIGS. 2a, 2b and 2c.

The multiple plane transducer row 500 may be fabricated by deposition of the first plane 502 on an undercoat layer 520 deposited on a substrate 518 using photolithographic and thin film deposition and plating processes known to the art followed by deposition of an insulator layer 522, preferably Al$_2$O$_3$, over the array of alternating read and write transducers of the first plane 502. A chemical mechanical etching process (CMP) is then used to flatten the surface 524 of the insulator layer 522. The second plane 504 is deposited with the desired offset relative to the first plane 502 on the planarized surface 524 of the insulator layer 522 by the same photolithographic and thin film deposition processes used in the deposition of the first plane 502. An insulator layer 526 is then deposited over the second plane 504. After a second planarization step to flatten the surface 527 of the insulator layer 526, the third plane 505 is deposited with any desired offset relative to the first or second planes 502 and 504 by photolithographic and thin film deposition and plating processes. A protective insulator layer 530 is then deposited over the third plane 505. It will be understood to those skilled in the art, that in the alternative, the order of the layers may be changed.

Figure 5B:
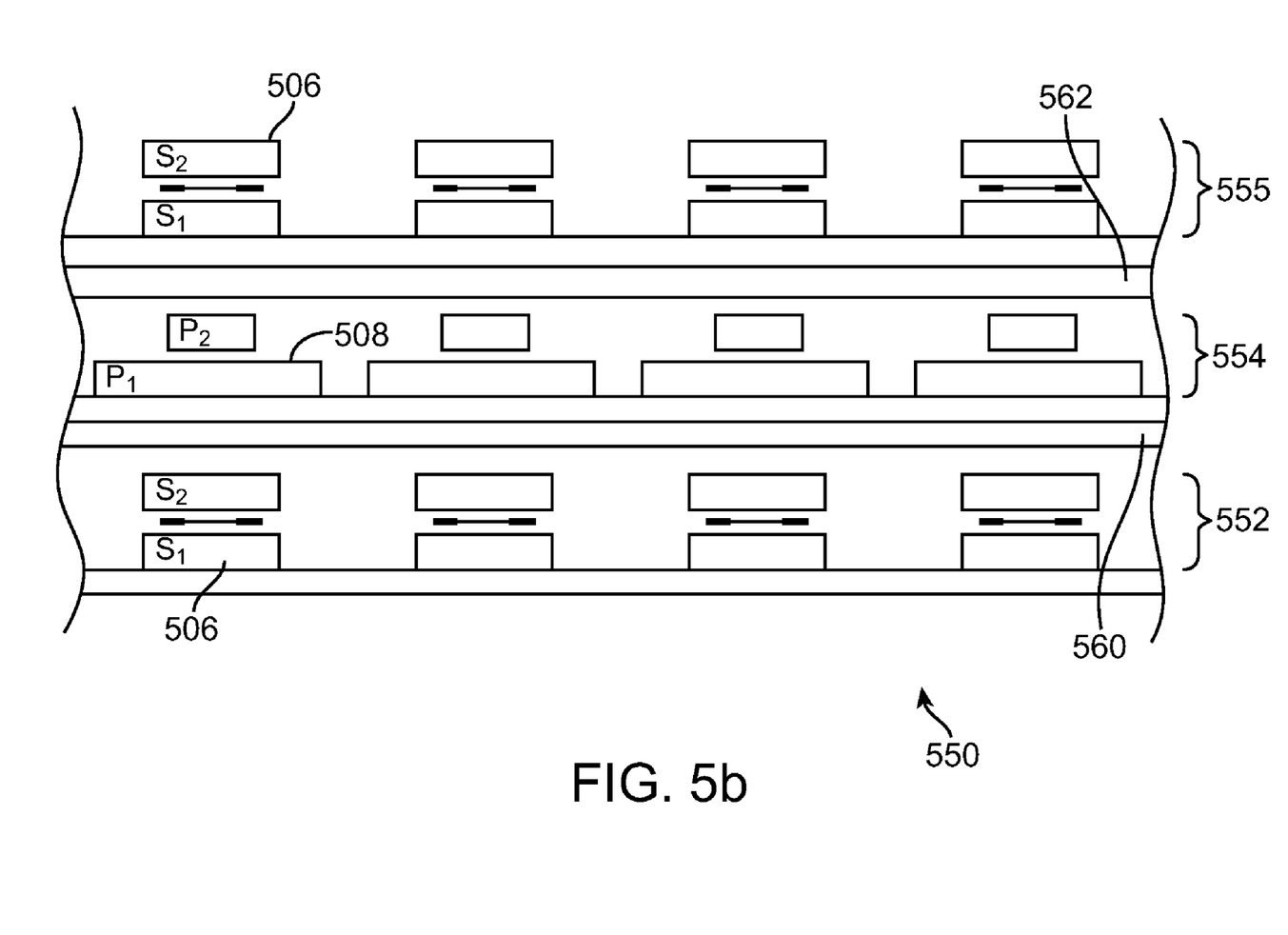
FIG. 5b is a transducing surface view, not to scale, of a bi-directional read-while-write head having an array of write transducers in a plane disposed between first and second planes of read transducer arrays.

FIG. 5b is an transducing surface view, not to scale, of another embodiment of the invention wherein a multiple plane transducer row 550 comprises a first plane 552 of spaced apart read transducers 506, a plane 554 of spaced apart write transducers 508 formed over the first plane 502 and a third plane 555 of spaced apart read transducers 506 formed over the second plane 554. In this embodiment, which provides a bi-directional read-while-write head, the three planes are not offset so that the read transducers of the first and third planes are aligned with the write transducers of the second plane. First and second EMI shield layers 560 and 562, respectively, are disposed between the first plane 552 of read transducers and the second plane 554 of write transducers and between the second plane 554 of write transducers and the third plane 555 of read transducers to allow simultaneous read-while-write operation for both forward and backward motion of the recording tape over the recording head. In this embodiment, the write transducers of the second plane 554 are used to write for both forward and reverse directions of the recording tape. Read transducers of the first plane 552 are used to provide immediate read-after-write verification of data for one direction (forward or backward) of the recording tape and read transducers of the third plane 555 are used for read-after-write verification of data for the other direction (backward or forward) of the recording tape.

Alternatively, a bi-directional read-while-write head may comprise first and third planes of write transducers and a second plane of read transducers disposed between the first and third planes. In this alternate embodiment, the write transducers of the first plane are used to write data for one direction (forward or backward) of the recording tape, the write transducers of the third plane are used to write data for the other direction (backward or forward) of the recording tape and the read transducers of the second plane are used to provide immediate read-after-write verification of data for both forward and reverse directions of the recording tape.

The shield layers S1 and S2 of the read transducers have been depicted herein above as separate shields for each individual read transducer in a plane. While separate individual shields are preferred for better isolation of the transducers, it will be understood that a single continuous first shield layer may be used for each plane of read transducers. Similarly, a single continuous second shield layer may be used for each plane of read transducers. The use of continuous shield layers for each plane of read transducers may provide some simplification of the fabrication processes. In a further simplification of the fabrication of multiple plane read transducer arrays, the second (top) shield layer of the plane of read transducers may be merged with the first (bottom) shield layer of the second plane of read transducers.

Figure 6:
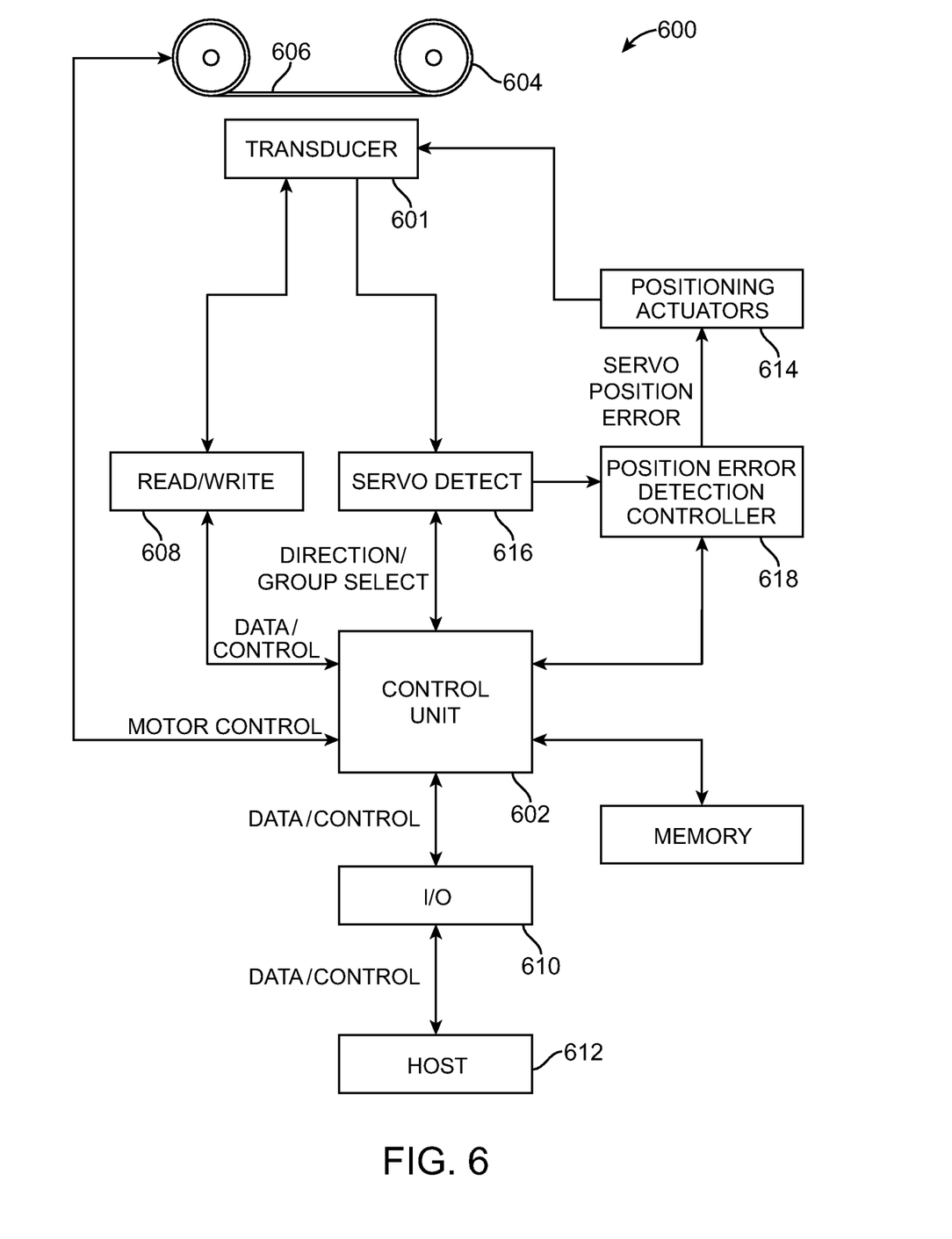
FIG. 6 is a simplified diagram of a magnetic tape recorder system using the magnetic recording head of the present invention.

FIG. 6 illustrates an embodiment of a magnetic tape recorder or tape drive system 600 incorporating the tape recording head of the present invention. A tape drive control unit 602 provides a motor control signal to rotate tape reels 604 and move magnetic tape 606 across the read/write transducer head 601. Read/write channel 608 transmits read/write signals between the read/write transducer 601 and the control unit 602. The data is communicated through I/O channel 610 with host 612. Lateral positioning of the transducer 601 with respect to the tape 606 is accomplished by coarse and fine positioning actuators 614. The lateral repositioning by a coarse actuator is required to access the various tracks of the tape 606 with the transducer 601. A servo system and fine actuator may be employed for accurate lateral repositioning of the transducer 602. An exemplary servo system includes a servo detector 616 to detect both the track that the head is currently on and whether the head is off center. Control unit 602 indicates the track address of a desired new track to position error detection controller 618 for repositioning the head. Servo detector 616 indicates the current track to position error detection controller 618, and the controller provides a servo position error signal to the coarse actuator of positioning actuators 614 which repositions the transducer 601 to the new track. The servo system also provides track following signals to the fine actuator of positioning actuators 614 so that the tracks on tape 606 may be closely spaced.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

We claim:

1. A multiple plane transducer row magnetic head comprising:
    a substrate;
    a first linear array of alternating side-by-side read and write transducers spaced apart in a direction substantially perpendicular to the direction of linear motion of a recording tape passing over the magnetic head fabricated in a first plane deposited on the substrate, the write transducers of the array being wider than the read transducers to provide an array of reduced pitch; and
    at least a second linear array of alternating side-by-side read and write transducers spaced apart in a direction substantially perpendicular to the direction of linear motion of the recording tape passing over the magnetic head fabricated in at least a second plane deposited over the first plane, the write transducers of the least a second array being wider than the read transducers to provide an array of reduced pitch, the at least a second linear array of alternating read and write transducers offset with respect to the first linear array of alternating read and write transducers, such that each read transducer of the first linear array is aligned with each write transducer of the at least a second linear array and each write transducer of the first linear array is aligned with each read transducer of the at least a second linear array allowing simultaneous reading or writing of closely spaced adjacent data tracks on the recording tape as the recording tape is passing over the magnetic head.

2. The magnetic head of claim 1, wherein the read transducers comprise magnetoresistive sensors chosen from the group consisting of AMR, GMR and MTJ sensors and wherein the write transducers are thin film inductive write transducers.

3. The magnetic head of claim 1, wherein the write transducers of the first away and the write transducers of the at least a second array are wider than the read transducers to provide an array of reduced pitch, the pitch of the arrays is reduced to substantially one half the pitch of one of a plane of transducers comprising read transducers or write transducers.

4. The magnetic head of claim 1, wherein an electromagnetic shield layer is disposed between the first plane and the second plane.

* * * * *